US008751640B2

(12) United States Patent
Yan et al.

(10) Patent No.: US 8,751,640 B2
(45) Date of Patent: Jun. 10, 2014

(54) SYSTEM AND METHOD FOR ENHANCING EFFICIENCY AND/OR EFFICACY OF SWITCHOVER AND/OR FAILOVER IN PROVIDING NETWORK BASED SERVICES WITH HIGH AVAILABILITY

(75) Inventors: Min Yan, Beijing (CN); Zhenghua Xu, Beijing (CN)

(73) Assignee: CA, Inc., Islandia, NY (US)

( * ) Notice: Subject to any disclaimer, the term of this patent is extended or adjusted under 35 U.S.C. 154(b) by 326 days.

(21) Appl. No.: 13/219,421

(22) Filed: Aug. 26, 2011

(65) Prior Publication Data

US 2013/0054781 A1    Feb. 28, 2013

(51) Int. Cl.
*G06F 15/173* (2006.01)
*G06F 11/20* (2006.01)

(52) U.S. Cl.
CPC ........ *G06F 11/2025* (2013.01); *G06F 11/2028* (2013.01); *G06F 11/2038* (2013.01)
USPC .......................................... 709/224; 709/226

(58) Field of Classification Search
CPC .................. G06F 11/2025; G06F 11/2028; G06F 11/2038
USPC ........................................................ 709/224
See application file for complete search history.

(56) References Cited

U.S. PATENT DOCUMENTS

| 5,652,908 | A | 7/1997 | Douglas et al. ............... 395/800 |
| 5,812,751 | A | 9/1998 | Ekrot et al. ............... 395/182.02 |
| 5,852,724 | A | 12/1998 | Glenn, II et al. ......... 395/200.69 |
| 8,135,732 | B2 | 3/2012 | Peng et al. ..................... 707/769 |
| 8,489,721 | B1 * | 7/2013 | Gokhale et al. ............... 709/223 |
| 2004/0153757 | A1 | 8/2004 | Blakeney ........................ 714/13 |
| 2005/0071195 | A1 | 3/2005 | Cassel et al. ...................... 705/2 |
| 2005/0223047 | A1 | 10/2005 | Shah et al. ..................... 707/201 |
| 2006/0101081 | A1 | 5/2006 | Lin et al. ....................... 707/200 |
| 2007/0055765 | A1 | 3/2007 | Lisiecki et al. ............... 709/223 |
| 2007/0168500 | A1 | 7/2007 | D'Souza et al. .............. 709/224 |
| 2007/0220323 | A1 | 9/2007 | Nagata ............................ 714/13 |
| 2008/0077636 | A1 | 3/2008 | Gupta et al. .................. 707/204 |
| 2008/0133300 | A1 | 6/2008 | Jalinous ........................... 705/7 |
| 2008/0294648 | A1 | 11/2008 | Lin et al. ........................ 707/10 |
| 2009/0024416 | A1 | 1/2009 | McLaughlin et al. ............ 705/3 |
| 2009/0292930 | A1 | 11/2009 | Marano et al. ................ 713/189 |
| 2011/0066611 | A1 | 3/2011 | Groeneveld et al. .......... 707/723 |
| 2011/0173491 | A1 | 7/2011 | Takamoto et al. ............ 714/4.11 |
| 2011/0219019 | A1 | 9/2011 | Peng et al. ..................... 707/769 |
| 2011/0225165 | A1 | 9/2011 | Burstein ....................... 707/741 |
| 2011/0239037 | A1 | 9/2011 | Peng et al. ......................... 714/3 |
| 2011/0289046 | A1 | 11/2011 | Leach et al. .................. 707/602 |
| 2012/0221526 | A1 | 8/2012 | Peng et al. ..................... 707/654 |
| 2013/0007505 | A1 * | 1/2013 | Spear ........................... 714/4.11 |

* cited by examiner

*Primary Examiner* — Hee Soo Kim
(74) *Attorney, Agent, or Firm* — Pillsbury Winthrop Shaw Pittman LLP

(57) ABSTRACT

A system is configured to provide a suite of network-based services to users with high availability. The suite of network-based services may include browser-based collaboration functions, process management functions, index functions, search functions, help search functions, document-management functions, and/or other functions. The suite of network-based services may correspond to services provided by a server application such as Microsoft® SharePoint™ being executed on one or more processors of one or more servers. As used herein, the term "high availability" may refer a system design protocol that ensures a certain degree of operational continuity during a given measurement period.

15 Claims, 3 Drawing Sheets

SYSTEM AND METHOD FOR ENHANCING EFFICIENCY AND/OR EFFICACY OF SWITCHOVER AND/OR FAILOVER IN PROVIDING NETWORK BASED SERVICES WITH HIGH AVAILABILITY

FIELD OF THE INVENTION

The invention relates to providing network-based services to users with high availability, and, in particular, to providing Microsoft® SharePoint™ services.

BACKGROUND OF THE INVENTION

Microsoft® SharePoint™ may be a rich enterprise server application that provides full content management features, implement business processes, and/or provide access to information related to organizational goals and/or processes.

High availability may be a system design protocol that ensures a certain degree of operational continuity. Conventional configurations of Microsoft® SharePoint™ may be challenged to meet high availability standards for a variety of reasons. For example, conventional configurations of servers providing redundancy involve a one-to-one standby server to online server set up that is costly in terms of hardware, bandwidth, and/or other resources. As another example, a server farm configuration database for a server farm serving the server application distributed by Microsoft® SharePoint™ may not be readily accessible to all of the servers in the farm. This may interfere with efficient switchover and/or failover to standby server(s).

SUMMARY

One aspect of the invention relates to a system and method providing a suite of network-based services, such as the services corresponding to the server application distributed by Microsoft® SharePoint™, to users with high availability. The suite of network-based services may include browser-based collaboration functions, process management functions, index and search functions, document-management functions, help and help search functions, and/or other functions. The system and method may enable a plurality of computing devices functioning as servers to serve the server application to users to be backed up by a single computing device, may centralize server farm administration through a website that communicates with servers serving the server application through application programming interfaces of the server application, and/or provides other enhancements.

In some implementations, the system may include a first online server, a second online server, a third online server, a standby server, and/or other components. The system may leverage one or more external information sources. Users may interface with the system and/or the external information sources via client computing platforms. The first online server, the second online server, the third online server, and/or the standby server may form a "server farm" configured to provide the server application services of the server application. For example, the first online server, the second online server, the third online server, and/or the standby server may host the network-based services over the network to the client computing platforms.

In order to provide the network-based services with high availability, the standby server may be configured as a backup to the first online server that replaces the first online server, the second online server, and/or the third online server in case of failover or switchover. For convenience, the term "changeover" will be used herein to refer to switching services from one server to another for either of failover or switchover.

Each of the first online server, the second online server, the third online server, and the standby server may be configured to execute a server application module. The server application module may be configured to provide one or more server application services associated with a server application. As used herein, the term "server application" may refer to one or more software elements that cause the processors of the servers to provide a suite of network-based services to users in a coordinated and cooperative manner.

The standby server may further be configured to execute computer program modules comprising one or more of a monitoring module, a classification module, a service configuration module, changeover module, and/or other modules.

The monitoring module may be configured to obtain the set of server application services being executed by the first server. The set of server application services may be obtained through querying the first server (e.g., through application programming interfaces, through a farm configuration database, through an administrative website, and/or via other mechanisms for obtaining information. The set of server application services may include a first service, a second service, and/or other services.

The classification module may be configured to determine whether individual ones of the server application services being provided by the production server are a primary service or a secondary service. A primary service may include a service which, if configured and then left offline (even if there is another instance of the service online in the farm), may cause complication within the server farm. A secondary service may not be subject to such complications.

The service configuration module may be configured to configure the set of server application services being provided by the first server on the standby server for changeover. The service configuration module may be configured such that, responsive to a determination that the first service is a secondary service, the first service may be configured on the standby server without waiting for receipt of a command to change the set of server application services over to the standby server. Responsive to a determination that the first service is a primary service, configuration of the first service on the standby server may be delayed until receipt of a command to change the set of server application services over to the standby server.

The changeover module may be configured to change the set of server application services over from the first server to the standby server responsive to a changeover event. At a changeover event, the changeover module may be configured to remove the set of server application services from the first server in the farm configuration database. The changeover module may bring the previously configured secondary server applications services online for the standby server. The changeover module may trigger configuration of the primary server application services to the standby server, and then may bring the primary server application services online for the standby server.

These and other objects, features, and characteristics of the present invention, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
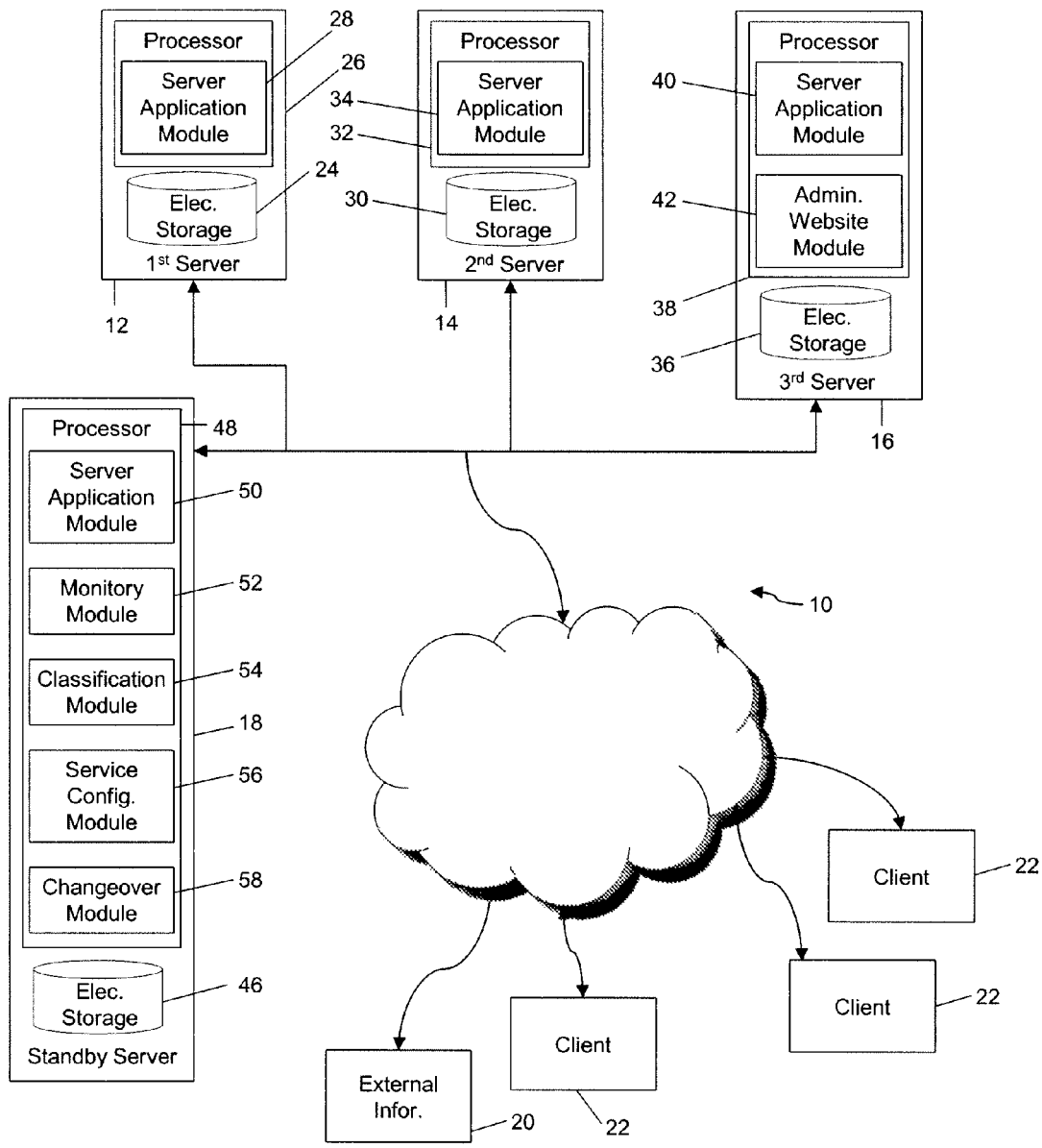
FIG. 1 illustrates a system configured to provide a site of network-based services to users with high availability, according to one or more embodiments of the invention.

FIG. 1 illustrates a system 10 configured to provide a suite of network-based services to users with high availability. The suite of network-based services may include browser-based collaboration functions, process management functions, index functions, search functions, help search functions, document-management functions, and/or other functions. The suite of network-based services may correspond to services provided by a server application such as Microsoft® SharePoint™ being executed on one or more processors of one or more servers. As used herein, the term "high availability" may refer a system design protocol that ensures a certain degree of operational continuity during a given measurement period. In some implementations, system 10 may include a first online server 12, a second online server 14, a third online server 16, a standby server 18, and/or other components.

The system 10 may leverage one or more external information sources 20. Users may interface with system 10 and/or external information sources 20 via client computing platforms 22. The components of system 10, external information sources 20, and/or client computing platforms 22 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which system 10, external information sources 20, and/or client computing platforms 22 are operatively linked via some other communication media.

A given client computing platform 22 may include one or more processors configured to execute computer program modules. The computer program modules may be configured to enable one or more users associated with the given client computing platform 22 to interface with system 10 and/or external information sources 20, and/or provide other functionality attributed herein to client computing platforms 22. By way of non-limiting example, the given client computing platform 22 may include one or more of a desktop computer, a laptop computer, a handheld computer, a NetBook, a Smartphone, and/or other computing platforms.

The external information sources 20 may be configured to provide information to system 10. This information may include content, user information, information related to achievements or accomplishments of users, and/or other information.

As is described further below, first online server 12, second online server 14, third online server 16, and/or standby server 18 may cooperate to provide the network-based services of the server application to users of client computing platforms 22 via the network. As such, first online server 12, second online server 14, third online server 16, and/or standby server 18 may form, at least in part, a "server farm" configured to provide the server application services of the server application. For example, first online server 12, second online server 14, third online server 16, and/or standby server 18 may host the network-based services over the network to client computing platforms 22. In order to provide the network-based services provided by first online server 12 with high availability, standby server 18 may be configured as a back-up to first online server 12 in case of failover or switchover. Failover may include situations in which a server (or one or more individual services hosted by a server) fails in an unexpected manner. Switchover may include situations in which the switch from first online server 12, second online server 14, and/or third online server 16 to standby server 18 is performed intentionally. For example, switchover may be executed to perform maintenance, to test one or servers, and/or for other purposes. For convenience, the term "changeover" will be used herein to refer to switching services from one server to another for either of failover or switchover.

Although first online server 12, second online server 14, third online server 16, and standby server 18 are each illustrated as a single entity in FIG. 1, this is not intended to be limiting. For example, two or more of these servers may implemented in a single computing device, or each of these servers may be implemented in a separate computing device. If two or more of the servers 12, 14, 16, and/or 18 are implemented in a single computing device, the processors and storage described herein as being associated with the different servers may actually be the same physical components.

The first online server 12 may include electronic storage 24, one or more processors 26, and/or other components. Electronic storage 20 may comprise electronic storage media that electronically stores information. The electronic storage media of electronic storage 24 may include one or both of system storage that is provided integrally (i.e., substantially non-removable) with first online server 12 and/or removable storage that is removably connectable to first online server 12 via, for example, a port (e.g., a USB port, a firewire port, etc.) or a drive (e.g., a disk drive, etc.). Electronic storage 24 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 24 may store software algorithms, information determined by processor 26, information received via the network, and/or other information that enables first online server 12 to function properly. Electronic storage 24 may be a separate component within first online server 12, or electronic storage 24 may be provided integrally with one or more other components of first online server 12 (e.g., processor 26).

Processor 26 may be configured to provide information processing capabilities in first online server 12. As such, processor 26 may include one or more of a digital processor, an analog processor, a digital circuit designed to process information, an analog circuit designed to process information, a state machine, and/or other mechanisms for electronically processing information. Although processor 26 is shown in FIG. 1 as a single entity, this is for illustrative purposes only. In some implementations, processor 26 may include a plurality of processing units. These processing units may be physically located within the same device, or processor 26 may represent processing functionality of a plurality of devices operating in coordination.

As is shown in FIG. 1, processor 26 may be configured to execute one or more computer program modules. The one or more computer program modules may include a server application module 28, and/or other modules. Processor 26 may be configured to execute module 28 by software; hardware; firmware; some combination of software, hardware, and/or firmware; and/or other mechanisms for configuring processing capabilities on processor 26. The description of the functionality provided by modules 28 described below is for illustrative purposes, and is not intended to be limiting, as module 28 may provide more or less functionality than is described.

The server application module 28 may be configured to provide one or more server application services associated with a server application. As used herein, the term "server application" may refer to one or more software elements that cause processor 26 to provide a suite of network-based services to users in a coordinated and cooperative manner with first online server 12, second online server 14, third online server 16, and/or standby server 18. For example, the server application may include the collection of software elements available from Microsoft® SharePoint™. The server application module 28 may be configured such that the server application provides application programming interfaces through which server application module 28 communicates with other computer program modules that are not an integral part of server application module 28.

In cooperating with second online server 14, third online server 16, and/or standby server 18 to provide the server application services to users, the server application module 28 may provide one or more of the server application services. Server application services provided by server application module 28 may be provided solely by server application module 28, or one or more individual server application services may be provided jointly by server application module 28 with one or more of second online server 14, third online server 16, and/or standby server 18. The server application services may include one or more of a web front-end service, a database service, a web-app server service, an indexing service, a query service, a spreadsheet calculation service, a help search service, a farm configuration database service, and/or other sub-modules.

The web front-end service may be configured to perform the functionality of a front-end web server in serving content over the network via a network communication protocol (e.g., HTTP and/or other protocols). The content may include webpages to be served to users (e.g., via client computing platforms 22). A webpage may include a document or resource that is accessible via a browser. These documents may be formatted in a mark-up format (e.g., HTML, XHTML, XML, and/or other mark-up formats). Serving the content may include receiving requests for content, receiving instructions for altering or calling content, and/or receiving other requests or instructions from client computing platform(s) 22, and then responding by providing the requested content (or locations of the requested content) to the requesting client computing platform(s) 22.

The database service may be configured to provide database services to users of client computing platforms 22 via the network. This may include processing database commands, queries, content, and/or other information related to a database, performing the requested actions and/or obtaining the requested information, and providing the results to the requesting client computing platform(s) 22.

The web-app server service may be configured to provide web application server functionality to client computing platforms 22. This may include executing a plurality of different information processing tasks at the request of client computing platforms 22, and then returning the results to client computing platforms 22.

The indexing service may be configured to provide an indexing service to the server application. As such, the indexing service may index information served by first online server 12, second online server 14, third online server 16, and/or standby server 18, metadata related to information served by first online server 12, second online server 14, third online server 16, and/or standby server 18, and/or other information. The indexing service may crawl content, logs, and/or other information sources associated with first online server 12, second online server 14, third online server 16, standby server 18, and/or other information and create an index in an ongoing manner. This index may be referenced to respond to queries and/or searches by users, administrators, and/or for other purposes.

The query service may be configured to provide a query service to the server application. As such, the query service can receive index information sent from all index services which may be deployed on any online servers and standby server. The query service responds the requests from online web front-end servers after processing the received index information.

The spreadsheet calculation service may be configured to enable farm users to load, calculate and display Excel workbooks by using web browsers. This service may be configured on all online servers and backup server for server application. All workbooks processed by this service are stored as farm content.

The help search service may be configured to handle the search tasks for SharePoint Help system. This service may be configured on online servers and backup server. The service replies on only indexes of SharePoint help content.

The farm configuration database service may be configured to maintain a farm configuration database related to the configuration of the first online server 12, second online server 14, third online server 16, and/or standby server 18 in executing the server application. The farm configuration database may include information related to current services being provided by the different servers, information related to jobs being performed by the servers in the server farm, information related to backup roles of the servers, information related to distribution of user contents, the information related to service status in the server farm, and/or other information.

The second online server 14 may include electronic storage 30, one or more processors 32, and/or other components. Electronic storage 30 may comprise electronic storage media that electronically stores information. The electronic storage media of electronic storage 30 may include one or both of system storage that is provided integrally (i.e., substantially non-removable) with second online server 14 and/or removable storage that is removably connectable to second online server 14 via, for example, a port (e.g., a USB port, a firewire port, etc.) or a drive (e.g., a disk drive, etc.). Electronic storage 30 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 30 may store software algorithms, information determined by processor 32, information received via the network, and/or other information that enables second online server 14 to function properly. Electronic storage 30 may be a separate component within second online server 14, or electronic storage 30 may be provided integrally with one or more other components of second online server 14 (e.g., processor 32).

Processor 32 may be configured to provide information processing capabilities in second online server 14. As such, processor 32 may include one or more of a digital processor, an analog processor, a digital circuit designed to process information, an analog circuit designed to process information, a state machine, and/or other mechanisms for electronically processing information. Although processor 32 is shown in FIG. 1 as a single entity, this is for illustrative purposes only. In some implementations, processor 32 may include a plurality of processing units. These processing units may be physically located within the same device, or processor 32 may represent processing functionality of a plurality of devices operating in coordination.

As is shown in FIG. 1, processor 32 may be configured to execute one or more computer program modules. The one or more computer program modules may include a server application module 34, and/or other modules. The server application module 34 may be substantially the same as server application module 28, and may be configured to provide one or more of the server application services associated with the server application.

The third online server 16 may include electronic storage 36, one or more processors 38, and/or other components. Electronic storage 36 may comprise electronic storage media that electronically stores information. The electronic storage media of electronic storage 36 may include one or both of system storage that is provided integrally (i.e., substantially non-removable) with third online server 16 and/or removable storage that is removably connectable to third online server 16 via, for example, a port (e.g., a USB port, a firewire port, etc.) or a drive (e.g., a disk drive, etc.). Electronic storage 36 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 36 may store software algorithms, information determined by processor 38, information received via the network, and/or other information that enables third online server 16 to function properly. Electronic storage 36 may be a separate component within third online server 16, or electronic storage 36 may be provided integrally with one or more other components of third online server 16 (e.g., processor 38).

Processor 38 may be configured to provide information processing capabilities in third online server 16. As such, processor 38 may include one or more of a digital processor, an analog processor, a digital circuit designed to process information, an analog circuit designed to process information, a state machine, and/or other mechanisms for electronically processing information. Although processor 38 is shown in FIG. 1 as a single entity, this is for illustrative purposes only. In some implementations, processor 38 may include a plurality of processing units. These processing units may be physically located within the same device, or processor 38 may represent processing functionality of a plurality of devices operating in coordination.

As is shown in FIG. 1, processor 38 may be configured to execute one or more computer program modules. The one or more computer program modules may include a server application module 40, an administration website module 42, and/or other modules. Processor 38 may be configured to execute modules 40 and/or 42 by software; hardware; firmware; some combination of software, hardware, and/or firmware; and/or other mechanisms for configuring processing capabilities on processor 38.

It should be appreciated that although modules 40 and/or 42 are illustrated in FIG. 1 as being co-located within a single processing unit, in implementations in which processor 38 includes multiple processing units, one or more of modules 40 and/or 42 may be located remotely from the other modules. The description of the functionality provided by the different modules 40 and/or 42 described below is for illustrative purposes, and is not intended to be limiting, as any of modules 40 and/or 42 may provide more or less functionality than is described. For example, one of modules 40 and/or 42 may be eliminated, and/or some or all of its functionality may be provided by other ones of modules 40 and/or 42. As another example, processor 38 may be configured to execute one or more additional modules that may perform some or all of the functionality attributed below to one of modules 40 and/or 42.

The server application module 40 may be substantially the same as server application modules 28 and/or 34, and may be configured to provide one or more of the server application services associated with the server application in coordination with modules 28 and/or 34.

The administration website module 42 may be configured to host a website configured to provide information to and receive information from first online server 12, second online server 14, third online server 16, and/or standby server 18. The website may communicate with first online server 12, second online server 14, third online server 16, and/or standby server 18 via application programming interfaces of the server application. The information provided to and received from first online server 12, second online server 14, third online server 16, and/or standby server 18 by the website may enable configuration of server roles and/or permit farm level application settings to be accessed, set, and/or adjusted by and/or for any of the servers in the farm (e.g., first online server 12, second online server 14, third online server 16, and/or standby server 18). At least some of these functions are discussed further below.

The standby server 18 may generally be configured to backup first online server 12. The second online server 14 and/or third online server 16 may be backed up by other standby servers (not shown). The standby server 18 may include electronic storage 46, one or more processors 48, and/or other components. Electronic storage 46 may comprise electronic storage media that electronically stores information. The electronic storage media of electronic storage 46 may include one or both of system storage that is provided integrally (i.e., substantially non-removable) with standby server 18 and/or removable storage that is removably connectable to standby server 18 via, for example, a port (e.g., a USB port, a firewire port, etc.) or a drive (e.g., a disk drive, etc.). Electronic storage 46 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 46 may store software algorithms, information determined by processor 48, information received via the network, and/or other information that enables standby server 18 to function properly. Electronic storage 46 may be a separate component within standby server 18, or electronic storage 46 may be provided integrally with one or more other components of standby server 18 (e.g., processor 48).

Processor 48 may be configured to provide information processing capabilities in standby server 18. As such, processor 48 may include one or more of a digital processor, an analog processor, a digital circuit designed to process information, an analog circuit designed to process information, a state machine, and/or other mechanisms for electronically processing information. Although processor 48 is shown in FIG. 1 as a single entity, this is for illustrative purposes only. In some implementations, processor 48 may include a plurality of processing units. These processing units may be physically located within the same device, or processor 48 may represent processing functionality of a plurality of devices operating in coordination.

As is shown in FIG. 1, processor 48 may be configured to execute one or more computer program modules. The one or more computer program modules may include a server application module 50, a monitoring module 52, a classification module 54, a service configuration module 56, a changeover module 58, and/or other modules. Processor 48 may be configured to execute modules 50, 52, 54, 56, and/or 58 by software; hardware; firmware; some combination of software, hardware, and/or firmware; and/or other mechanisms for configuring processing capabilities on processor 48.

It should be appreciated that although modules 50, 52, 54, 56, and/or 58 are illustrated in FIG. 1 as being co-located within a single processing unit, in implementations in which processor 48 includes multiple processing units, one or more of modules 50, 52, 54, 56, and/or 58 may be located remotely from the other modules. The description of the functionality provided by the different modules 50, 52, 54, 56, and/or 58 described below is for illustrative purposes, and is not intended to be limiting, as any of modules 50, 52, 54, 56, and/or 58 may provide more or less functionality than is described. For example, one of modules 50, 52, 54, 56, and/or 58 may be eliminated, and/or some or all of its functionality may be provided by other ones of modules 50, 52, 54, 56, and/or 58. As another example, processor 48 may be configured to execute one or more additional modules that may perform some or all of the functionality attributed below to one of modules 50, 52, 54, 56, and/or 58. Further, in some implementations, some or all of the functionality of modules 50, 52, 54, 56, and/or 58 described below may be performed by another server.

The server application module 50 may be substantially the same as server application modules 28, 34, and/or 40. As such, server application module 50 may be configured to function as a backup for first online server 12 for the server application services provided by server application module 28. Backing up first online server 12 may include being configured to handle switchover and/or failover of sets of one or more server application services being currently provided by individual ones of first online server 12.

For some server applications, such as the server application distributed by Microsoft® SharePoint™, individual server application services may be provided by a plurality of servers (e.g., the web front-end service may be provided by a plurality of servers to facilitate load-balancing), and/or individual server application services may be provided by a single server in the farm (e.g., the indexing service may typically be provided by a single server). Similarly, an individual server may be dedicated to providing a single server application service (alone or in conjunction with other server(s)), or an individual server may be used to provide a plurality of server application services.

In some implementations, first online server 12, second online server 14, third online server 16, and standby server 18 may be separate computing devices. The first online server 12 may be executing server application module 28 to provide a first set of server application services to users. The first set of server application services may include a first service, a second service, and/or other services. The standby server 18 may be configured to backup the first set of server application services.

The monitoring module 52 may be configured to obtain a set of server application services being provided by first online server 12 via server application module 28. This information may be obtained from the website administered by administration website module 42, from the farm configuration database maintained by the configuration database service, from first online server 12 (e.g., via an application programming interface associated with server application module 28), and/or from other information sources. The set of server application services may include a first service, a second service, and/or other services.

The classification module 54 may be configured to determine whether individual ones of the server application services being provided by server application module 28 are a primary service or a secondary service. A primary service may be a service which, if left inactive in the server farm, causes complications that may inhibit operation of other services. Primary services may perform tasks required for internal collaboration with other services. Take the query service as an example. In order to maintain consistent content among the servers, all servers participating in performing the query service must be online to receive index files from the index service. The help search service also may restrict farm wide WSS DB backup operations so that if all help search services are not online, a backup tool provided by the server application (e.g., the "stsadm" tool provided by SharePoint) and/or 3rd party tools may hang up when executing a task. Secondary services, on the other hand, may include server application services which may have servers that are offline. These may include, for example, web front-end service, an index service, a spreadsheet calculation service, based on current SharePoint architecture, we don't have to add any more, and/or other services. The classification module 54 may determined the classifications of the services based on a lookup table, from an identifier associated with the services, and/or via other mechanisms.

The service configuration module 56 may be configured to configured to configure the server application services (e.g., the first, second, and/or third services) to server application module 50. In conventional systems, this may include configuring all the server applications on server application module 50 in anticipation of a changeover from server application module 40 to server application module 50, and then keeping the backed up server application services offline until they are needed. However, in some server applications, such as the server application provided by Microsoft SharePoint™, performing such activities with respect to primary services may cause failure, and/or other complications, for the server application. In system 10, for primary server application services, standby configuration module 60 may delay configuring until a changeover to server application module 50 has actually been initiated. While this may increase the amount of time that the primary server application services are offline during the changeover, it may avoid the issues caused by taking the primary server application services offline to configure them on server application module 50 without changing them over to server application module 50. This is because if a changeover has not been initiated, the server farm (e.g., including first online server 12, second online server 14, and/or third online server 16) may expect the primary server application services to be online. Whereas, if a changeover has been initiated, the server farm does not expect the primary server application services to be online (e.g., because the previous servers are no longer indicated as providing the services in the farm configuration database for the reasons discussed below).

By way of example, responsive to the first service of the set of server application services provided by server application module 40 being a secondary server application service, service configuration module 56 may be configured to configure server application module 50 to back up server application module 40 with respect to the first service without waiting for initiation of a changeover from first online server 12 to standby server 18. As another example, responsive to the second service of the second set of server application services being a primary server application services, service configuration module 56 may be configured to delay configuring server application module 50 to back up server application module 40 with respect to the second service until a changeover from first online server 12 to standby server 18 has been initiated.

The changeover module 58 may be configured to change server application services from server application module 40 over to server application module 50 responsive to a changeover event (e.g., a failover or switchover event). For a given server application service, this may include removing the given server application service from server application module 40 in the farm configuration database. This may be performed by directly interfacing the farm database service (e.g., via an application program interface), through the administrative website maintained through administrative website module 42, and/or via other mechanisms. The changeover module 58 may then enter the given server application service for server application module 50 in the farm configuration database. The changeover module 58 may be configured to only enter the given server application service for server application module 50 in the farm configuration database responsive to the given server application service being configured by service configuration module 56 on standby server 18.

Responsive to the given server application service being a primary service, changeover module 58 may be configured to trigger configuration of the given server application service to server application module 50 by service configuration module 56. This may occur after changeover module 58 has removed the given server application service the farm configuration database. Thus, as the given server application service is being configured to server application module 50, the given server application service may not be shown as online or offline in the farm configuration database. Responsive to configuration of the given server application service on server application module 50 being completed, changeover module 58 may enter the given server application service for server application module 50 in the farm configuration database, bringing the given server application service online for the server farm.

Responsive to the given server application service being a secondary service, changeover module 58 may be configured, at changeover, to remove the given server application service for server application module 40 from the farm configuration database. Then changeover module 58 may then bring the given server application service, which would have already been configured and taken offline by service configuration module 56, online.

Figure 2:
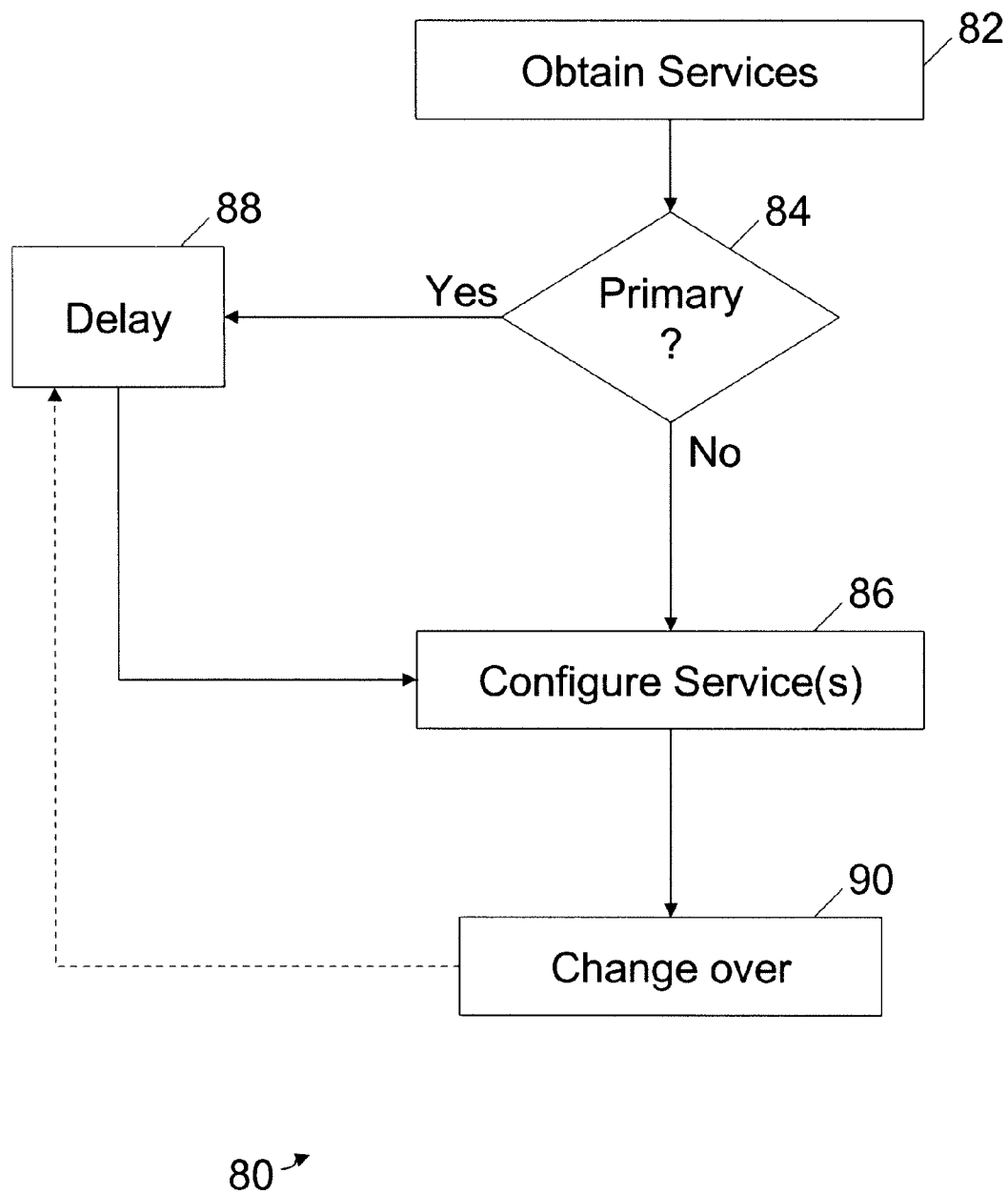
FIG. 2 illustrates a method of backing up one or more servers cooperating to serve a server application with a standby server, in accordance with one or more embodiments of the invention.

FIG. 2 illustrates a method 80 of backing up one or more servers cooperating to serve a server application with a standby server. The operations of method 80 presented below are intended to be illustrative. In some embodiments, method 80 may be accomplished with one or more additional operations not described, and/or without one or more of the operations discussed. Additionally, the order in which the operations of method 80 are illustrated in FIG. 2 and described below is not intended to be limiting.

In some embodiments, method 80 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 80 in response to instructions stored electronically on an electronic storage medium. The one or more processing devices may include one or more devices configured through hardware, firmware, and/or software to be specifically designed for execution of one or more of the operations of method 80.

At an operation 82, a set of server application services associated with the server application that are to be backed up by the standby server are obtained. The set of server application services may include a first service. In some implementations, operation 82 may be performed by a monitoring module similar to or the same as monitoring module 52 (as shown in FIG. 1 and described above).

At an operation 84, a determination may be made as to whether the first service is a primary service or a secondary service. A primary service may include a server application service that is relied upon by other server application services such that the server application service being offline may cause failure and/or other complications for the server application. In some implementations, operation 84 may be performed by a classification module similar to or the same as classification module 54 (as shown in FIG. 1 and described above).

Responsive to a determination at operation 84 that the first service is a secondary service, the first service may be configured on the standby server in anticipation of a changeover at an operation 86. This may include configuring the first service on the standby server without waiting for initiation of a changeover to the standby server. In some implementations, operation 86 may be performed by a service configuration module similar to or the same as service configuration module 56 (as shown in FIG. 1 and described above).

Responsive to a determination at operation 84 that the first service is a primary service, configuration of the first service on the standby server may be delayed at an operation 88 until initiation of changeover of the first service to the standby server. While this may require a longer delay during the changeover, it will prevent, or inhibit, operation of the server application being negatively impacted by an offline instance of the first service. In some implementations, operation 88 may be performed by a service configuration module similar to or the same as service configuration module 56 (as shown in FIG. 1 and described above).

At an operation 90, changeover to the standby server may be accomplished. This may include bringing secondary server application services that have previously been configured (e.g. at operation 86). Operation 90, for primary server application services, may include removing the primary server application services from the server being brought offline, triggering configuration of the primary server application services on the on the standby server, and/or bringing the primary server application services online on the standby server. In some implementations, operation 90 may be performed by a changeover module similar to or the same as changeover module 58 (shown in FIG. 1 and described above).

This hybrid approach for configuring primary and secondary server application services on the standby server may enhance operation of the server application with respect to conventional and/or unified approaches. The anticipatory configuration of secondary server application services reduces down time of the server application and/or the server application services during changeover, while the delay of configuring the primary server application services enhances server application operation in advance of any changeover.

Figure 3:
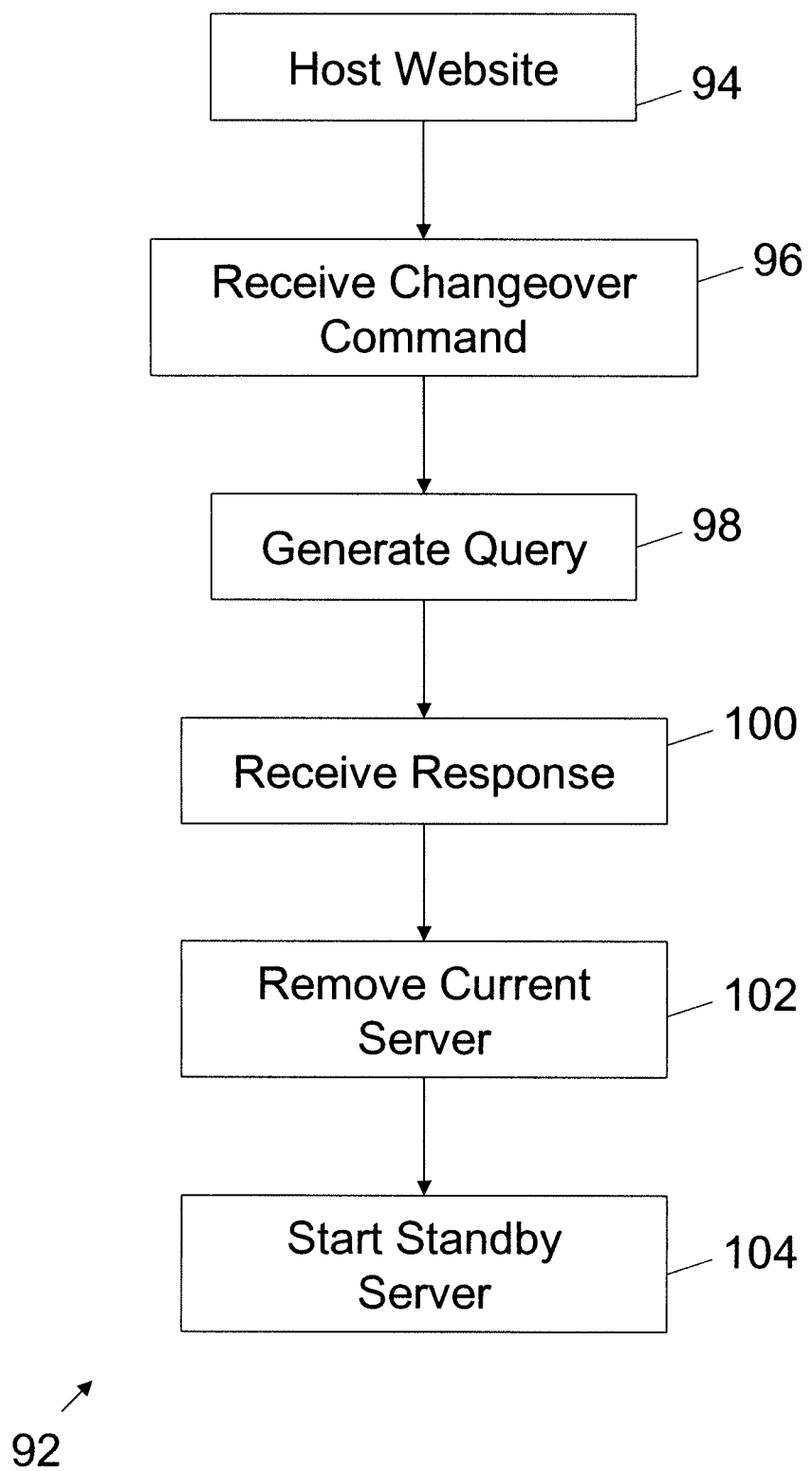
FIG. 3 illustrates a method of backing up an online server serving a server application service of a server application with a standby server, in accordance with one or more embodiments of the invention.

FIG. 3 illustrates a method 92 of backing up an online server serving a server application service of a server application with a standby server. The operations of method 92 presented below are intended to be illustrative. In some embodiments, method 92 may be accomplished with one or more additional operations not described, and/or without one or more of the operations discussed. Additionally, the order in which the operations of method 92 are illustrated in FIG. 3 and described below is not intended to be limiting.

In some embodiments, method 92 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 92 in response to instructions stored electronically on an electronic storage medium. The one or more processing devices may include one or more devices configured through hardware, firmware, and/or software to be specifically designed for execution of one or more of the operations of method 92.

At an operation 94, a website may be hosted. The website may be configured to provide information to and/or receive information from the one or more online servers and/or the one or more standby servers through application programming interfaces of the server application. In some implementations, operation 94 may be performed by an administration website module similar to or the same as administration website module 42 (as shown in FIG. 1 and described above).

At an operation 96, a command to changeover the server application service from the online server to the standby server may be received. The command may be received at the website from an application programming interface of the server application. In some implementations, operation 96 may be performed by an administration website module similar to or the same as administration website module 42 (as shown in FIG. 1 and described above).

At an operation 98, a query for an identification of the online server currently serving the server application service may be generated. The query may be transmitted through the website via an application programming interface of the server application. The query may be directed to one of the online servers serving a server farm administrative database. In some implementations, operation 98 may be performed by a changeover module similar to or the same as changeover module 58 (as shown in FIG. 1 and described above).

At an operation 100, a response to the query may be received from the website. The query may arrive at the website via an application programming interface of the server application. The response may identify the online server currently serving the server application service. In some implementations, operation 100 may be performed by a changeover module similar to or the same as changeover module 58 (as shown in FIG. 1 and described above).

At an operation 102, instructions may be generated that remove the online server from currently serving the server application service. If the online server currently serving the server application service is performing method 92 (e.g., if it is the "local" server), operation 102 may include issuing an unprovision instruction to the online server that removes the online server from currently serving the server application service. If the online server currently serving the server application service is not the local server, operation 102 may include generating instructions for transmission to the server farm configuration database (e.g., through the website via an application programming interface of the server application) to remove the online server from serving the server application service. The instructions may further include instructions to the server farm configuration database removing the job by which the online server is removed from serving the server application service. This may facilitate changeover back to the online server at some future point in time. In some implementations, operation 102 may be performed by a changeover module similar to or the same as changeover module 58 (as shown in FIG. 1 and described above).

At an operation 104, the serving of the server application service by the standby server may be initiated. This may include generating instructions that are transmitted through the website to an application programming interface of the server application.

Although the invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

What is claimed is:

1. A computer-implemented method of backing up one or more servers cooperating to serve a server application with a standby server, the standby server comprising a processor configured to execute a computer program module, the method comprising:

obtaining a set of server application services associated with the server application that are to be backed up by the standby server, the set of server application services comprising a first service;

determining whether the first service is a primary service or a secondary service;

responsive to the determining that the first service is a secondary service, configuring the first service on the standby server without waiting for receipt of a command to change the set of server application services over to the standby server; and responsive to the determining that the first service is a primary service, delaying configuring the first service on the standby server until receipt of a command to change the set of server application services over to the standby server.

2. The method of claim 1, wherein the set of server application services further comprise a second service, and wherein the method further comprises:

determining whether the second service is a primary service or a secondary service;
responsive to determining that the second service is a secondary service, configuring the second service on the standby server without waiting for receipt of a command to change the set of server application services over to the standby server; and
responsive to determining that the second service is a primary service, delaying configuring the second service on the standby server until receipt of a command to change the set of server application services over to the standby server.

3. The method of claim 1, wherein the primary service in the set of server application services comprises one or both of a query service, and/or a help search service.

4. The method of claim 1, wherein the secondary service in the set of server application services comprises one or more of a web front-end service, an index service, or a spreadsheet calculation service.

5. The method of claim 1, further comprising:
receiving a command to change the set of server application services over to the standby server;
responsive to receipt of the command and previous determination that the first service is a secondary service, changing the first service over to the standby server; and
responsive to receipt of the command and previous determination that the first service is a primary service, configuring the first service on the standby server and then changing the first service over to the standby server.

6. A system configured to provide server application services of a server application with high availability, the system comprising:
a production server configured to execute an instance of the server application, and to provide a set of server application services associated with the server application;
a standby server configured to provide backup for the production server, the standby server being further configured to execute an instance of the server application, the standby server further being configured to execute computer program modules comprising:
a monitoring module configured to obtain the set of server application services being executed by the production server, the set of server application services comprising a first service,
a classification module configured to determine whether individual ones of the server application services being provided by the production server are a primary service or a secondary service, and
a service configuration module configured to configure the server application services being provided by the production server on the standby server for changeover, the service configuration module being further configured (i) such that, responsive to the determination that the first service is a secondary service, the first service is configured on the standby server without waiting for receipt of a command to change the set of server application services over to the standby server, and (ii) such that responsive to the determination that the first service is a primary service, configuration of the first service on the standby server is delayed until receipt of a command to change the set of server application services over to the standby server.

7. The system of claim 6, wherein the set of server application services further comprise a second service, and wherein the service configuration module is further configured (i) such that, responsive to a determination that the second service is a secondary service, the second service is configured on the standby server without waiting for receipt of a command to change the set of server application services over to the standby server, and (ii) such that, responsive to determining that the second service is a primary service, configuration of the second service on the standby server is delayed until receipt of a command to change the set of server application services over to the standby server.

8. The system of claim 6, wherein the primary service in the set of server application services comprises one or both of a query service, and/or a help search service.

9. The system of claim 6, wherein the secondary service in the set of server application services comprises one or more of a web front-end service, an index service, or a spreadsheet calculation service.

10. The system of claim 6, wherein the computer modules further comprise a changeover module configured (i) to receive a command to change the set of server application services over to the standby server, (ii) responsive to receipt of the command and previous determination that the first service is a secondary service, to change the first service over to the standby server, and (iii) responsive to receipt of the command and previous determination that the first service is a primary service, to trigger configuration of the first service on the standby server by the service configuration module and then to change the first service over to the standby server.

11. A computer program product comprising:
a non-transitory computer readable storage medium comprising computer-readable program code embodied therewith, the computer readable program code comprising:
computer readable program code configured to obtain a set of server application services associated with a server application that are to be backed up by a standby server, the set of server application services comprising a first service;
computer readable program code configured to determine whether the first service is a primary service or a secondary service;
computer readable program code configured to, responsive to the determination that the first service is a secondary service, configure the first service on the standby server without waiting for receipt of a command to change the set of server application services over to the standby server; and
computer readable program code configured to, responsive to the determination that the first service is a primary service, delay configuration of the first service on the standby server until receipt of a command to change the set of server application services over to the standby server.

12. The computer program product of claim 11, wherein the set of server application services further comprise a second service, and the computer readable program code further comprises:
computer readable program code configured to determine whether the second service is a primary service or a secondary service;
computer readable program code configured to, responsive to determination that the second service is a secondary service, configure the second service on the standby server without waiting for receipt of a command to change the set of server application services over to the standby server; and
computer readable program code configured to, responsive to determination that the second service is a primary service, delay configuration of the second service on the standby server until receipt of a command to change the set of server application services over to the standby server.

13. The computer program product of claim 11, wherein the primary service in the set of server application services comprises one or both of a query service, and/or a help search service.

14. The computer program product of claim 11, wherein the secondary service in the set of server application services comprises one or more of a web front-end service, an index service, or a spreadsheet calculation service.

15. The computer program product of claim 11, wherein the computer readable program code further comprises:
   computer readable program code configured to receive a command to change the set of server application services over to the standby server;
   computer readable program code configured to, responsive to receipt of the command and previous determination that the first service is a secondary service, change the first service over to the standby server; and
   computer readable program code configured to, responsive to receipt of the command and previous determination that the first service is a primary service, configure the first service on the standby server and then change the first service over to the standby server.

* * * * *

UNITED STATES PATENT AND TRADEMARK OFFICE
CERTIFICATE OF CORRECTION

| | | |
|---|---|---|
| PATENT NO. | : 8,751,640 B2 | Page 1 of 1 |
| APPLICATION NO. | : 13/219421 | |
| DATED | : June 10, 2014 | |
| INVENTOR(S) | : M. Yan et al. | |

It is certified that error appears in the above-identified patent and that said Letters Patent is hereby corrected as shown below:

In the Claims

Column 15, line 58 (claim 6, line 29) change "that responsive" to -- that, responsive --

Signed and Sealed this
Twenty-fifth Day of November, 2014

Michelle K. Lee
*Deputy Director of the United States Patent and Trademark Office*